Figure 1:
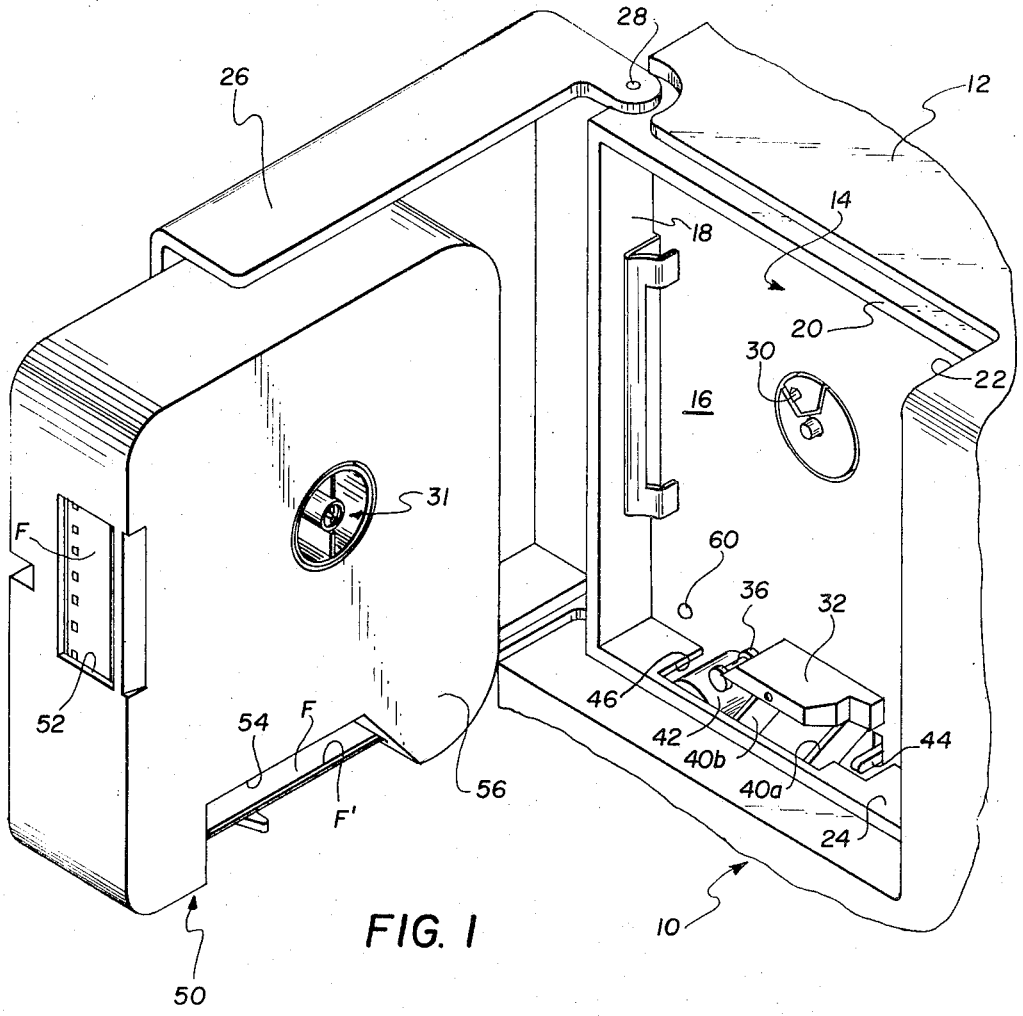
Figure 2:
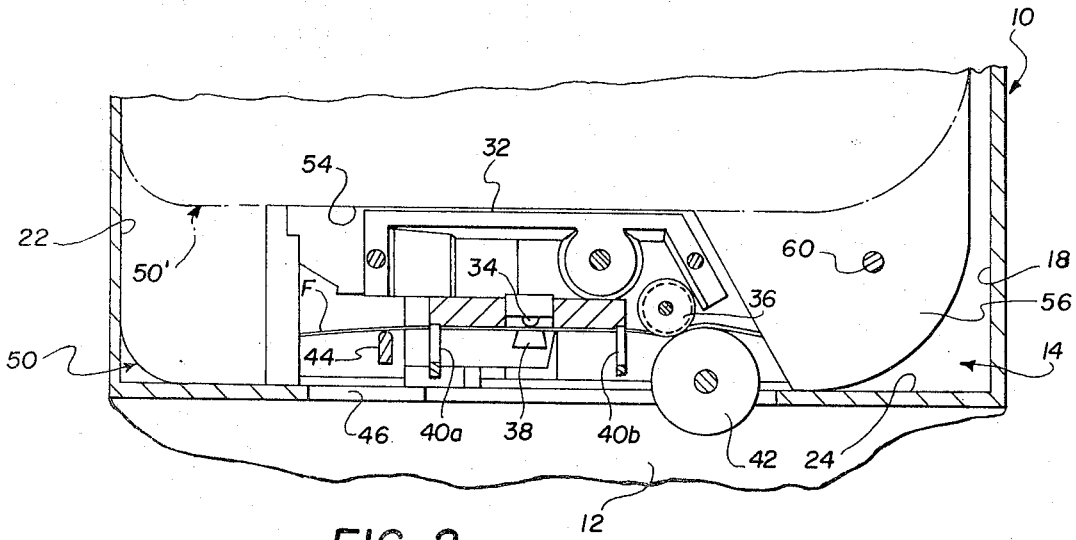
Figure 3:
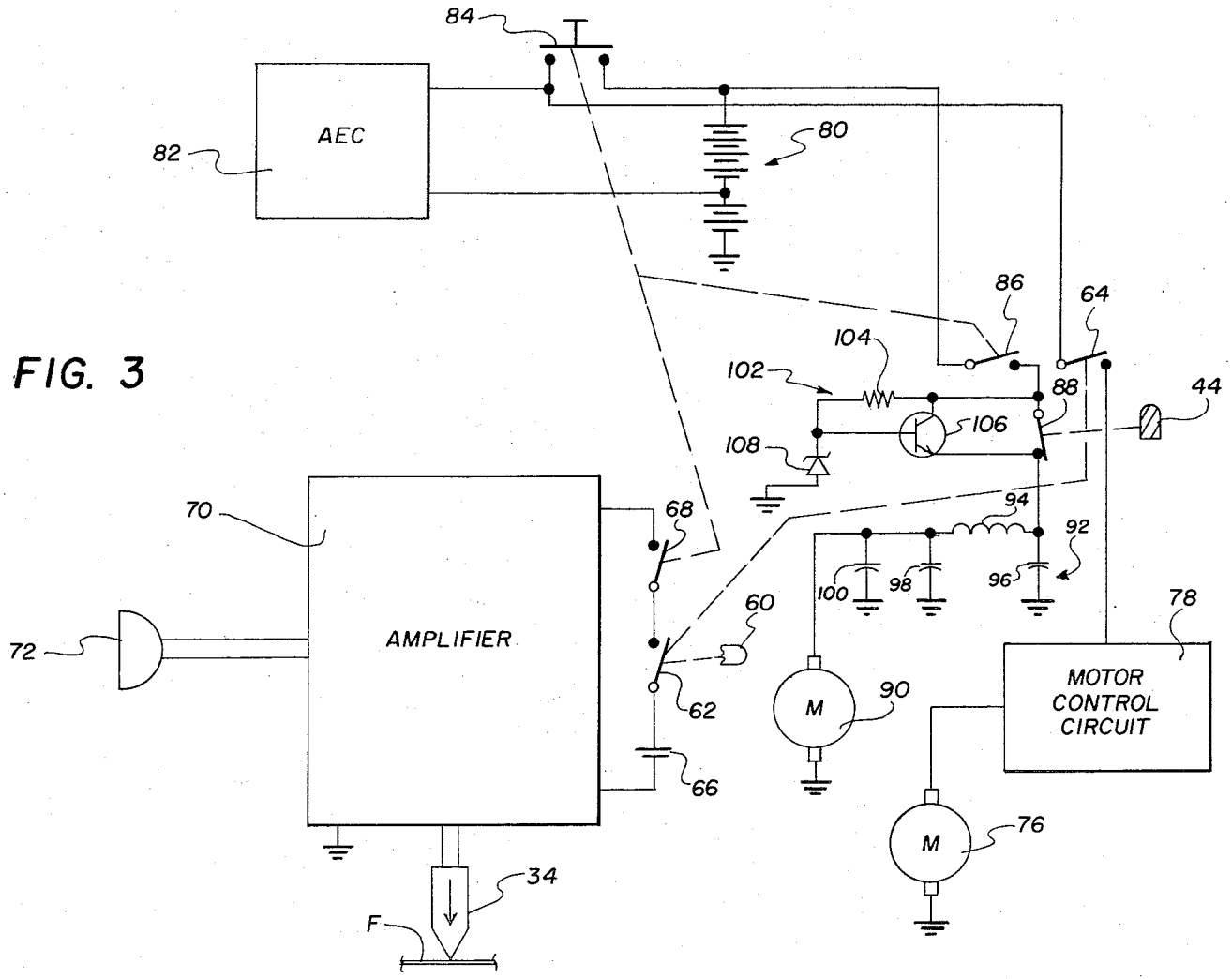

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 9

T920,009
CONTROL MEANS FOR A SOUND MOTION PICTURE CAMERA

Gerald J. Kosarko, Pavilion, N.Y.
(901 Elmgrove Road, Rochester, N.Y. 14650)

Filed Apr. 30, 1972, Ser. No. 356,005
Int. Cl. G03b *23/02*
U.S. Cl. 352—72
2 Sheets Drawing. 12 Pages Specification

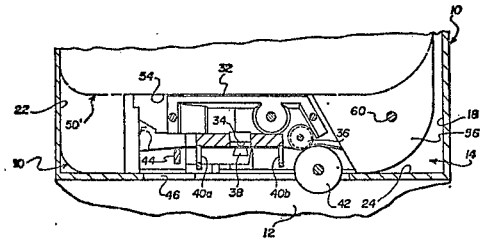

A motion picture camera or the like incorporating a sound system for recording of sound onto film during exposure of film to scene light includes a switch which is closed by a sensor when the sensor detects the proper positioning into the camera of a film cartridge containing sound film. When the switch is closed and the camera is energized to initiate exposure of film frames to scene light, a circuit is completed to sound apparatus in the camera and to a capstan drive for the sound apparatus. In the absence of the sound cartridge, such as when a conventional, non-sound or silent cartridge is positioned in the camera, the switch remains open, thereby de-energizing the sound apparatus and capstan motor to avoid drain on the related battery or power supply. The switch can be in a circuit including a battery, a second switch that is closed when the camera is energized by the operator engaging a trigger mechanism, and an amplifier circuit comprising part of the sound apparatus. The camera disclosed has a motor for the film pull-down mechanism and a separate capstan motor for the sound apparatus. The sensor also closes a third switch to the capstan motor when a sound cartridge is in the camera, and opens the third switch at other times. Also disclosed is a circuit for controlling the speed of the motor for the pull-down mechanism as a function of the size of the loop between that mechanism and the sound capstan.

CONTROL MEANS FOR A SOUND MOTION PICTURE CAMERA

Filed April 30, 1973 2 Sheets-Sheet 1

CONTROL MEANS FOR A SOUND MOTION PICTURE CAMERA

Filed April 30, 1973 2 Sheets-Sheet 2